US009723367B1

(12) United States Patent
Long et al.

(10) Patent No.: US 9,723,367 B1
(45) Date of Patent: Aug. 1, 2017

(54) IDENTIFYING CONTENT APPROPRIATE FOR CHILDREN VIA A BLEND OF ALGORITHMIC CONTENT CURATION AND HUMAN REVIEW

(71) Applicant: Google Inc., Mountain View, CA (US)

(72) Inventors: Eileen Margaret Peters Long, San Jose, CA (US); Shirley Connie Gaw, Paris (FR); Sertan Girgin, Paris (FR); Geethmala Sridaran, San Bruno, CA (US); Stephen Nicholls, Sunnyvale, CA (US); Bosun Adeoti, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/628,297

(22) Filed: Feb. 22, 2015

(51) Int. Cl.
*H04N 21/475* (2011.01)
*H04N 21/4545* (2011.01)
*H04N 21/466* (2011.01)

(52) U.S. Cl.
CPC ..... *H04N 21/4751* (2013.01); *H04N 21/4545* (2013.01); *H04N 21/4665* (2013.01); *H04N 21/4667* (2013.01); *H04N 21/4668* (2013.01); *H04N 21/4756* (2013.01)

(58) Field of Classification Search
CPC ......... H04N 21/4788; H04N 21/23418; H04N 21/2743; H04N 21/64322; H04N 21/454; H04N 21/4821; H04N 21/4542; H04N 21/4751; H04N 21/4756
See application file for complete search history.

(56) References Cited

U.S. PATENT DOCUMENTS

| 5,911,043 | A | * | 6/1999 | Duffy | G06Q 30/06 707/E17.109 |
| 6,571,256 | B1 | * | 5/2003 | Dorian | G06F 17/30876 707/915 |
| 2001/0054112 | A1 | * | 12/2001 | Nobakht | G06F 17/30884 709/245 |
| 2002/0078440 | A1 | * | 6/2002 | Feinberg | H04N 5/44543 725/9 |

(Continued)

OTHER PUBLICATIONS

CYBERSitter for a Family Friendly Internet, Feb. 1999, http:web.archive.org/web/19990220150359/www.cybersitter.com/cybinfo.htm) discloses blocking content which is objectionable to children, p. 1.*

*Primary Examiner* — Nathan Flynn
*Assistant Examiner* — Cynthia Fogg
(74) *Attorney, Agent, or Firm* — Lowenstein Sandler LLP

(57) ABSTRACT

Implementations disclose identifying content appropriate for children. A method includes selecting a list of candidate channels from a plurality of channels based on an automatically generated rating of each of the plurality of channels, filtering the list of candidate channels based on feedback received from a first group of reviewers with respect to appropriateness of content of each candidate channel for children, selecting a list of candidate videos based on an automatically generated rating of each video from every channel in the filtered list of candidate channels, and upon receiving, via a graphical user interface, a confirmation that a candidate video from the list of candidate videos is appropriate for children, setting a confirmation indicator of the candidate video to enable presentation of the candidate video to children.

20 Claims, 8 Drawing Sheets

(56) References Cited

U.S. PATENT DOCUMENTS

| | | | | |
|---|---|---|---|---|
| 2003/0066075 | A1* | 4/2003 | Bahn | H04N 5/44543 725/25 |
| 2004/0117831 | A1* | 6/2004 | Ellis | H04N 5/44543 725/53 |
| 2005/0144297 | A1* | 6/2005 | Dahlstrom | H04L 63/101 709/229 |
| 2005/0166235 | A1* | 7/2005 | Mears | H04N 5/44513 725/47 |
| 2006/0130118 | A1* | 6/2006 | Damm | H04L 63/0245 725/135 |
| 2007/0212025 | A1* | 9/2007 | Barton | G11B 27/105 386/261 |
| 2008/0040748 | A1* | 2/2008 | Miyaki | G11B 27/036 725/46 |
| 2009/0210909 | A1* | 8/2009 | Mukerji | H04N 5/44543 725/51 |
| 2011/0063317 | A1* | 3/2011 | Gharaat | G06Q 30/0244 345/545 |
| 2012/0210342 | A1* | 8/2012 | Gonzalez | H04N 21/4532 725/25 |
| 2014/0007150 | A1* | 1/2014 | Bhide | H04N 21/454 725/14 |
| 2014/0344861 | A1* | 11/2014 | Berner | H04N 21/4826 725/46 |
| 2014/0380359 | A1* | 12/2014 | Musil | H04N 21/6582 725/34 |

* cited by examiner

IDENTIFYING CONTENT APPROPRIATE FOR CHILDREN VIA A BLEND OF ALGORITHMIC CONTENT CURATION AND HUMAN REVIEW

TECHNICAL FIELD

This disclosure relates to the field of content sharing platforms and, in particular, to identifying content appropriate for children using a combination of algorithmic content curation and human review.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes selecting a list of candidate channels from a plurality of channels based on an automatically generated rating of each of the plurality of channels, wherein each candidate channel in the list of candidate channels has an automatically generated rating that indicates appropriateness of content of a respective candidate channel for children. The method also includes filtering, by a processing device, the list of candidate channels based on feedback received from a first group of reviewers with respect to appropriateness of content of each candidate channel for children, and selecting a list of candidate videos based on an automatically generated rating of each video from every channel in the filtered list of candidate channels, wherein each candidate video in the list of candidate videos has an automatically generated rating that indicates appropriateness of a respective candidate video for children. The method further includes upon receiving, via a graphical user interface, a confirmation that a candidate video from the list of candidate videos is appropriate for children, setting a confirmation indicator of the candidate video to enable presentation of the candidate video to children.

In some implementations, the list of candidate channels further comprises candidate playlists. In some implementations, the automatically generated rating of the respective candidate channel is generated by a first classifier.

In some implementations, the method also includes providing the feedback received from the first group of reviewers to the first classifier for further training of the first classifier. In some implementations, each automatically generated rating is an indicator of child-safe content or an indicator of child-safe and child-relevant content.

In some implementations, the list of candidate channels comprises, for each candidate channel, a location identifier of the candidate channel, a name of the candidate channel, etc. In some implementations, the feedback generated from the first group of reviewers comprises, for each candidate channel, (a) an indication that content of the candidate channel is child-safe, or an indication that the content of the candidate channel is not child-safe and a reason for the indication that the content of the candidate channel is not child-safe, (b) an indication that the content of the candidate channel is child-relevant, or an indication that the content of the candidate channel is not child-relevant and a reason for the indication that the content of the candidate channel is not child-relevant, and (c) a confirmation indication that the candidate channel is to remain on the list, or a rejection indication that the candidate channel is to be removed from the list.

In some implementations, filtering the list of candidate channels comprises removing, from the list of candidate channels, any candidate channel associated with a rejection indication. In some implementations, selecting the list of candidate videos comprises identifying candidate videos from the filtered list of candidate channels, and removing duplicate videos and previously reviewed videos from the identified candidate videos.

In some implementations, the graphical user interface includes a name of the candidate video, an image of the candidate video, a rating generated by a second classifier, one or more categories associated with the candidate video, an identifier of the candidate video, and a channel associated with the candidate video. In some implementations, the method includes providing the graphical user interface facilitating review of candidate videos from the list of candidate videos by a second group of reviewers, wherein the graphical user interface facilitates user input confirming that the video is appropriate for children or user input indicating that the video is not appropriate for children.

In some implementations, the method further includes providing the user input regarding appropriateness of the video for children to the second classifier for further training of the second classifier. In some implementations, videos with set confirmation indicators are selectable for display on a home screen user interface of a children-specific content application. In some implementations, the method includes blacklisting or whitelisting a channel from the list of candidate channels based on the feedback received from the first group of reviewers.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Figure 1:
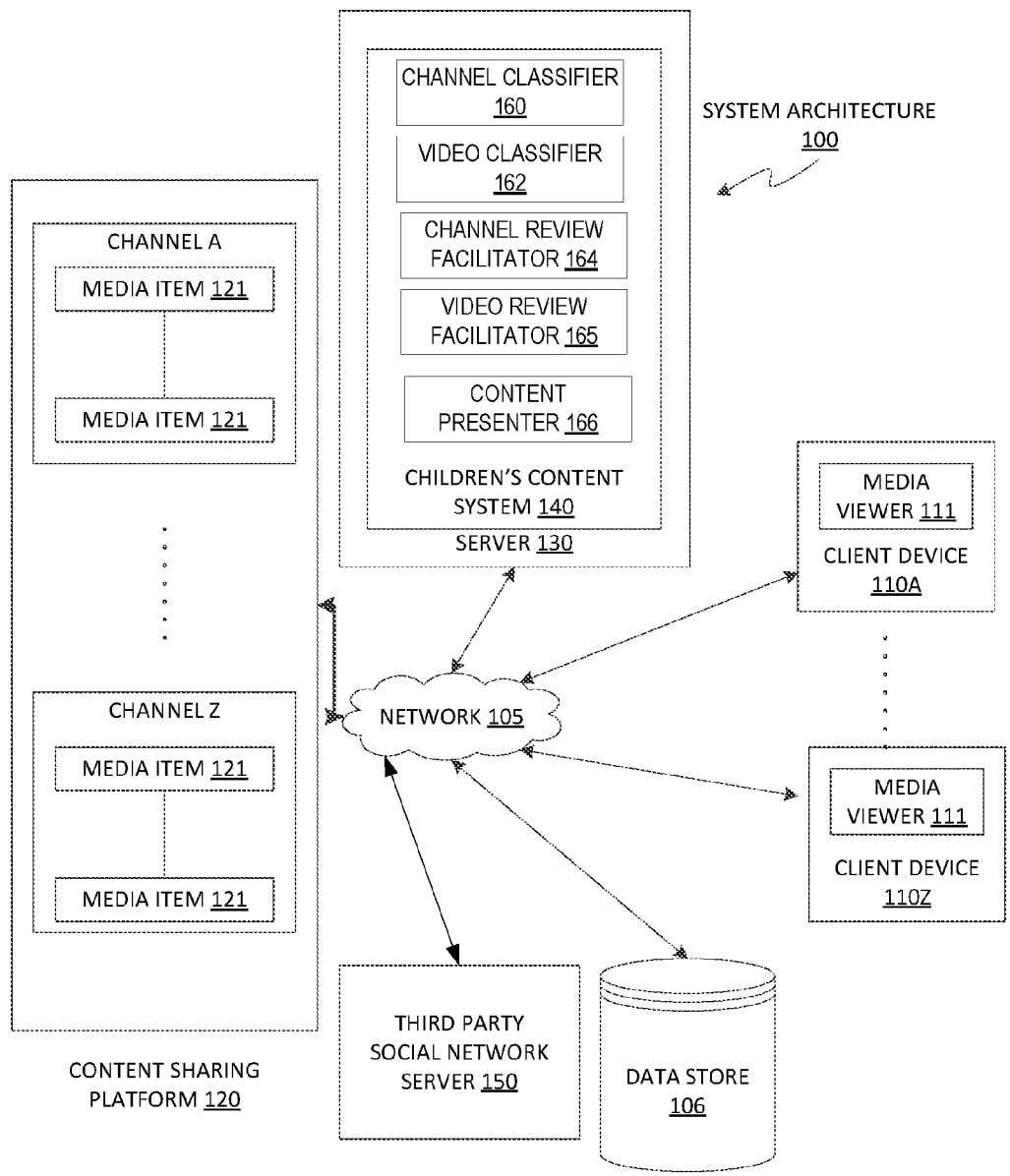
FIG. 1 is a block diagram illustrating an exemplary network architecture in which implementations of the present disclosure may be implemented.

Aspects and implementations of the disclosure are directed to identifying content appropriate for children via a blend of algorithmic video content curation and human review. Implementations are described for a children's content system of a content sharing platform, where the children's content system enables the identification, curation, and presentation of content appropriate and relevant for children.

Existing content curation solutions for children are typically either based on a pure manual curation of content or a solely algorithmic curation of content. Manual curation of content is accurate but can be very inefficient when handling high volumes of content. As to the algorithmic curation, it may accurately classify content most of the time. However, it cannot provide a continuous age-appropriate and age-relevant content viewing experience for children.

Implementations of the disclosure address the above deficiencies by combining algorithmic content curation with manual content review. In particular, a children's content system can include a content classifier that automatically assigns ratings to channels based on appropriateness of channel content for children. For example, a content classifier can assign, to a channel, a rating indicating that content of the channel is safe (e.g., not mature, violent or explicit) for children of any age or for children in a specific age group (e.g., younger than 5 years old, between 5 years old and 8 years old, between 9 years old and 12 years old, or between 13 years old and 17 years old). In another example, the content classifier may assign, to a channel, a rating indicating that content of the channel is not only safe but also relevant (e.g., interesting or entertaining) for children. Alternatively, the content classifier can assign, to a channel, a rating indicating that the content of the channel requires parental guidance or is not safe for children (e.g., is mature, violent, controversial, explicit, etc.). In some implementations, the content classifier can additionally or alternatively assign ratings to playlists in a similar manner. In some implementations, the children's content system can use multiple classifiers to assign ratings to different types of content (e.g., different classifiers for channels and playlists).

Based on the ratings automatically assigned by the content classifier, the children's content system can select candidate channels (and/or candidate playlists) for presentation to children. In some implementations, channels/playlists that have ratings indicating that their contents are safe for children and channels/playlists that have ratings indicating that their contents are both safe and relevant for children are selected as candidates. The resulting list of candidate channels can include, for each candidate channel, a location identifier of the candidate channel, and a name of the candidate channel. The resulting list can also include candidate playlists with similar data.

The list of candidate channels and/or candidate playlists can be provided to a first group of reviewers for review and feedback. In some implementations, the feedback provided by the first group of reviewers can include (a) an indication that content of the candidate channel is child-safe, or an indication that the content of the candidate channel is not child-safe and a reason for the indication that the content of the candidate channel is not child-safe, (b) an indication that the content of the candidate channel is child-relevant, or an indication that the content of the candidate channel is not child-relevant and a reason for the indication that the content of the candidate channel is not child-relevant, and (c) a confirmation indication that the candidate channel is to remain on the list, or a rejection indication that the candidate channel is to be removed from the list. If the list includes candidate playlists, similar feedback can be provided for each candidate playlist. The children's content system can provide the feedback regarding candidate channels and/or candidate playlists as input to the content classifier to further train the content classifier, thus continuously improving the accuracy of channel/playlist ratings provided by the content classifier.

In addition, based on the above feedback, the children's content system can filter the list of candidate channels and/or candidate playlists by removing from the list any candidate with a rejection indicator and/or any candidate that has been rated as not child-safe. The children's content system can then compile a list of candidate videos that are part of the remaining candidate channels and/or candidate playlists, identify duplicate videos (e.g., if multiple channels or multiple playlists include the same videos or the videos that have been previously reviewed), remove duplicate videos from the list, and provide the resulting list for review by a second group of reviewers. Each video from the list can include a rating generated by a content classifier (the same content classifier that classifies channels and/or playlists or a different content classifier that is designated to classification of videos). A content classifier can generate a rating for a video when the video is uploaded to the content sharing platform or at a later time. A rating automatically generated for a video can indicate that the video is safe for children of any age or for children in a specific age group (e.g., younger than 5 years old, between 5 years old and 8 years old, between 9 years old and 12 years old, or between 13 years old and 17 years old). In another example, the rating can indicate that the video is not only safe but also relevant for children. Alternatively, the rating can indicate that the video requires parental guidance or is not safe for children. In some implementations, the children's content system removes, from the list, any video that has a rating indicating that the video is not safe for children. In some implementations, the children's content system can also remove any video that has a rating indicating that the video requires parental guidance.

The children's content system provides a graphical user interface (GUI) to facilitate reviews of the videos from the list of candidate videos. The GUI can allow a reviewer to select one of the candidate videos. The GUI can then present, for the selected video, the name of the video, an image (e.g., a thumbnail image) of the video, a rating automatically generated for the video by the content classifier, one or more categories associated with the video, an identifier of the video, and a channel associated with the video. The GUI can also present options for other ratings, and the reviewer can either select the automatically generated rating or one of the other ratings to improve quality of rating. If the selected rating confirms that the video is child-safe or child-safe and child-relevant, then the children's content system sets a confirmation indicator of the video to indicate a child-appropriate rating (e.g., by setting the value of the confirmation indicator in the video's metadata to a child-safe rating or a child-safe and child-relevant rating). The children's content system can then present videos that have such confirmation indicators to children (e.g., on a home screen of a children-specific application provided by the content sharing platform, on a home page of a children-specific website of the content sharing platform, etc.). The children's content system can also provide the rating selected for the video by the reviewer as input to the content classifier to further train the content classifier, thus continuously improving the accuracy of video ratings provided by the content classifier.

Accordingly, aspects of the present disclosure use a combination of algorithmic content classification and manual content review to enhance safety of content presented to children and to provide an additional input to the content classifier algorithm to further improve algorithmic classification accuracy. As a result, children can be continuously presented with age-appropriate content selected from a very large number of content items (e.g., billions of videos).

The present disclosure often references videos for simplicity and brevity. However, the teaching of the present disclosure are applied to media items generally and can be applied to various types of content or media items, including for example, video, audio, text, images, program instructions, etc. The media items referred to herein represent viewable and/or shareable media items.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.). According to aspects of the present disclosure, the media viewer 111 may a children-specific application that allows users to view and search for content appropriate for children.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. The content sharing platform 120 may also store playlists created by users, third parties or automatically. A playlist may include a list of content items (e.g., videos) that can be played (e.g., streamed) in sequential or shuffled order on the content sharing platform.

In one implementation, the server 130 may be one or more computing devices (e.g., a rackmount server, a server computer, etc.). The server 130 may be included in the content sharing platform 120 or be part of a different system. The server 130 may host a children's content system 140. The children's content system 140 enables the identification, curation, and presentation of content appropriate for children in implementations of the disclosure. Content appropriate for children may refer to one or more content items that are safe (e.g., not mature, violent or explicit) and/or relevant (e.g., entertaining or interesting) for children.

The children's content system 140 may include several components (e.g., modules, sub-modules, applications, etc.) that can be executed by one or more processors of a machine hosting the children's content system 140. These components may include, for example, a channel classifier 160, a video classifier 162, a channel review facilitator 164, a video review facilitator 165, and a content presenter 166. More or less components can be included in the children's content system 140 to provide functionality described herein.

Channel classifier 160 can automatically assign ratings to channels based on appropriateness of channel content for children. For example, channel classifier 160 can assign, to a channel, a rating indicating that content of the channel is safe (e.g., not mature, violent or explicit) for children of any age or for children in a specific age group (e.g., younger than 5 years old, between 5 years old and 8 years old, between 9 years old and 12 years old, or between 13 years old and 17 years old). In another example, the channel classifier 160 may assign, to a channel, a rating indicating that content of the channel is not only safe but also relevant (e.g., interesting or entertaining) for children. Alternatively, the channel classifier 160 can assign, to a channel, a rating indicating that the content of the channel requires parental guidance or is not safe for children (e.g., is mature, violent, controversial, explicit, etc.). In some implementations, the channel classifier 160 can additionally or alternatively assign ratings to playlists in a similar manner. A rating may be stored with a respective channel or playlist, or separately in data store 106 in association with a channel or playlist identifier. The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The channel classifier 160 can generate ratings using a machine learning algorithm such as a neural network algorithm, a support vector machine (SVM) algorithm, etc. Some aspects of the functionality of the channel classifier 160 will be discussed in more detail below in conjunction with FIG. 5.

Video classifier 162 can generate ratings for videos uploaded to the content sharing platform 120. The video classifier 162 can generate a rating for a video when the video is uploaded to the content sharing platform or at a later time. A rating automatically generated for a video can indicate that the video is safe for children of any age or for children in a specific age group (e.g., younger than 5 years old, between 5 years old and 8 years old, between 9 years old and 12 years old, or between 13 years old and 17 years old). In another example, the rating can indicate that the video is not only safe but also relevant for children. Alternatively, the rating can indicate that the video requires parental guidance or is not safe for children. A rating may be stored with the video (e.g., as part of its metadata) or separately in data store 106 in association with the video identifier. The video classifier 162 can generate ratings using a machine learning algorithm such as a neural network algorithm, an SVM algorithm, etc. Some aspects of the functionality of the video classifier 162 will be discussed in more detail below in conjunction with FIG. 5.

The channel review facilitator 164 can use channel ratings automatically generated by the channel classifier 160 to select candidate channels (and/or candidate playlists) for presentation on a home screen of a children-specific video application or a home page of a children-specific video website. In some implementations, the channel review facilitator 164 only selects channels/playlists that have ratings indicating that their contents are safe for children and channels/playlists that have ratings indicating that their contents are both safe and relevant for children as candidates. The channel review facilitator 164 obtains, from the content sharing platform 120, information about the selected candidate channels/playlists and includes this information in the resulting list. In particular, the channel review facilitator 164 can collect, and include in the list, a location identifier of a candidate channel, and a name of the candidate channel. The resulting list can also include candidate playlists with similar data.

The channel review facilitator 164 can provide the resulting list to the first group of reviewers in a tabular form (e.g., as a spreadsheet populated with rows for different channels/playlists and columns for different parameters associated with respective channels/playlists).

The first group of reviewers can review candidate channels and/or candidate videos in the list and provide feedback for each candidate by adding values to respective fields. In some implementations, the feedback can include (a) an indication that content of the candidate channel is child-safe, or an indication that the content of the candidate channel is not child-safe and a reason for the indication that the content of the candidate channel is not child-safe, (b) an indication that the content of the candidate channel is child-relevant, or an indication that the content of the candidate channel is not child-relevant and a reason for the indication that the content of the candidate channel is not child-relevant, and (c) a confirmation indication that the candidate channel is to remain on the list, or a rejection indication that the candidate channel is to be removed from the list. Similar feedback can be provided for each candidate playlist. The channel review facilitator 164 can then extract the feedback on candidate channels and/or candidate playlists from the respective fields and provide it as input to the channel classifier 160 to further train the channel classifier 160, thus continuously improving the accuracy of channel/playlist ratings provided by the channel classifier 160.

The video review facilitator 165 can analyze the list of candidate channels and/or candidate playlists that is created by the channel review facilitator 165, and filter this list by removing from the list any candidate with a rejection indicator and/or any candidate that has been rated as not child-safe. The video review facilitator 165 can then compile a list of candidate videos that are part of the remaining candidate channels and/or candidate playlists, identify duplicate videos (e.g., if multiple channels or multiple playlists include the same videos), identify videos that have been previously reviewed (using the value of a confirmation indicator of a video), remove duplicate videos and previously reviewed videos from the list, and provide the resulting list for review by a second group of reviewers. The second group of reviewers may be the same as, or different from the first group of reviewers. Each reviewer in the first or second group is an individual who is able to accurately rate content for age-appropriateness and age-relevancy. Each video from the list can include a rating generated by the video classifier 162. In some implementations, the video review facilitator 165 removes, from the list, any video that has a rating indicating that the video is not safe for children.

The video review facilitator 165 can provide a GUI to assist the second group of reviewers in reviewing the videos from the list of candidate videos. The GUI can allow a reviewer to select one of the candidate videos. The GUI can then present, for the selected video, the name of the video, an image (e.g., a thumbnail image) of the video, a rating automatically generated for the video by the content classifier, one or more categories associated with the video, an identifier of the video, and a channel associated with the video. The GUI can also present options for other ratings, and the reviewer can either select the automatically generated rating or one of the other ratings. An example GUI will be discussed in more detail below in conjunction with FIG. 7.

The video review facilitator 165 determines whether the selected rating confirms that the video is child-safe or child-safe and child-relevant, and sets a confirmation indicator of the video accordingly (e.g., by setting the value of the confirmation indicator in the video's metadata to indicate the selected rating). The video review facilitator 165 can also provide the rating selected for the video by the reviewer as input to the video classifier 162 to further train the video classifier 162.

The content presenter 166 can select videos that have confirmation indicators for presentation to children (e.g., on a home screen of a children-specific application provided by the content sharing platform, on a home page of a children-specific website of the content sharing platform, etc.).

In some implementations, children's content system 140 of server 130 may interact with content sharing platform 120 and/or with other third party social network servers 150.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
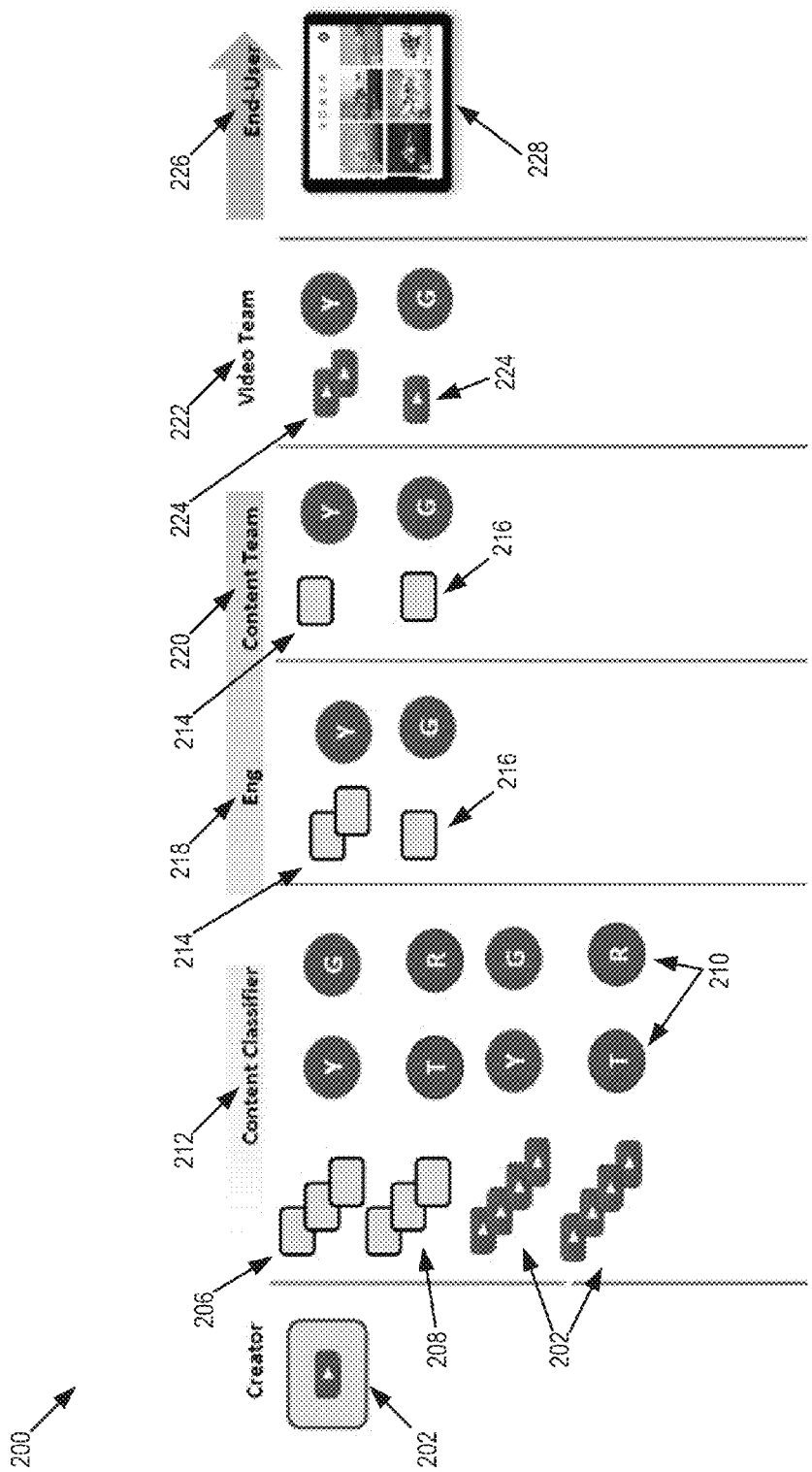
FIG. 2 is a block diagram illustrating operation of a children's content system 140 in accordance with one implementation of the disclosure, according to an implementation.

FIG. 2 is a block diagram illustrating operation of children's content system 140 in accordance with one implementation of the disclosure. Referring to FIG. 2, videos 202 are uploaded to content sharing platform 120 by their owners (e.g., video creators or uploaders) to be viewed by various users. As discussed above, the content sharing platforms also provides channels 206 created by channel owners and playlists 208 created by playlist owners or automatically. Children's content system 140 includes a content classifier 212 (e.g., channel classifier 160 and/or video classifier 162) that generates ratings 210 for channels 206, playlists 208 and videos 202. One implementation of content classifier 212 is discussed in more detail below in conjunction with FIG. 5.

Ratings 210 can include, for example, a rating indicating that content of the channel or playlist is safe (e.g., not mature, violent or explicit) for children of any age (rating G), a rating indicating that content of the channel or playlist is both safe and relevant for children of any age (rating Y), a rating indicating that content of the channel or playlist is safe for teenagers (rating T), a rating indicating that content of the channel or playlist requires parental guidance (rating PG), a rating indicating that content of the channel or playlist is for mature audience and is inappropriate for children (rating M or R), and a rating indicating that content of the channel or playlist includes explicit content and is inappropriate for children (rating X).

Based on ratings 210, the children's content system 140 selects, at phase 218, candidate channels 214 and playlists 216 for presentation to children. In one implementation, only channels and playlists that have either a young children's rating (Y rating) or a general audiences rating (G rating) are selected as such candidates.

At phase 220, a first team of reviewers (content team) reviews the filtered list of candidate channels 214 and candidate playlists 216, and provides feedback. In some implementations, the feedback can include (a) an indication that content of the candidate channel/playlist is child-safe, or an indication that the content of the candidate channel/playlist is not child-safe and a reason for the indication that the content of the candidate channel/playlist is not child-safe, (b) an indication that the content of the candidate channel/playlist is child-relevant, or an indication that the content of the candidate channel/playlist is not child-relevant and a reason for the indication that the content of the candidate channel/playlist is not child-relevant, and (c) a confirmation indication that the candidate channel/playlist is to remain on the list, or a rejection indication that the candidate channel/playlist is to be removed from the list. The children's content system 140 can provide the feedback on candidate channels and/or candidate playlists as input to the content classifier 212 to further train the content classifier 212.

Based on the above feedback, the children's content system 140 filters the list of candidate channels and candidate playlists, identifies videos that are part of the candidate channels and candidate playlists from the filtered list, selects, from the identified videos, candidate videos 224 that have ratings Y or G, and provides candidate videos 224 to a second team of reviewers (video team). At phase 222, the children's content system 140 provides a GUI to assist the second team of reviewers in reviewing candidate videos 224. For each candidate video 224, a reviewer can either confirm the rating generated by the content classifier 212 or select a different rating. Those videos that have rating Y or G after phase 222 can then be used by the children's content system 140 at phase 226 to populate home screen 228 of the children-specific video application.

It should be noted that the present disclosure mentions ratings Y and G only as examples, and various other ratings can be used with aspects of the present disclosure without loss of generality.

Figure 3:
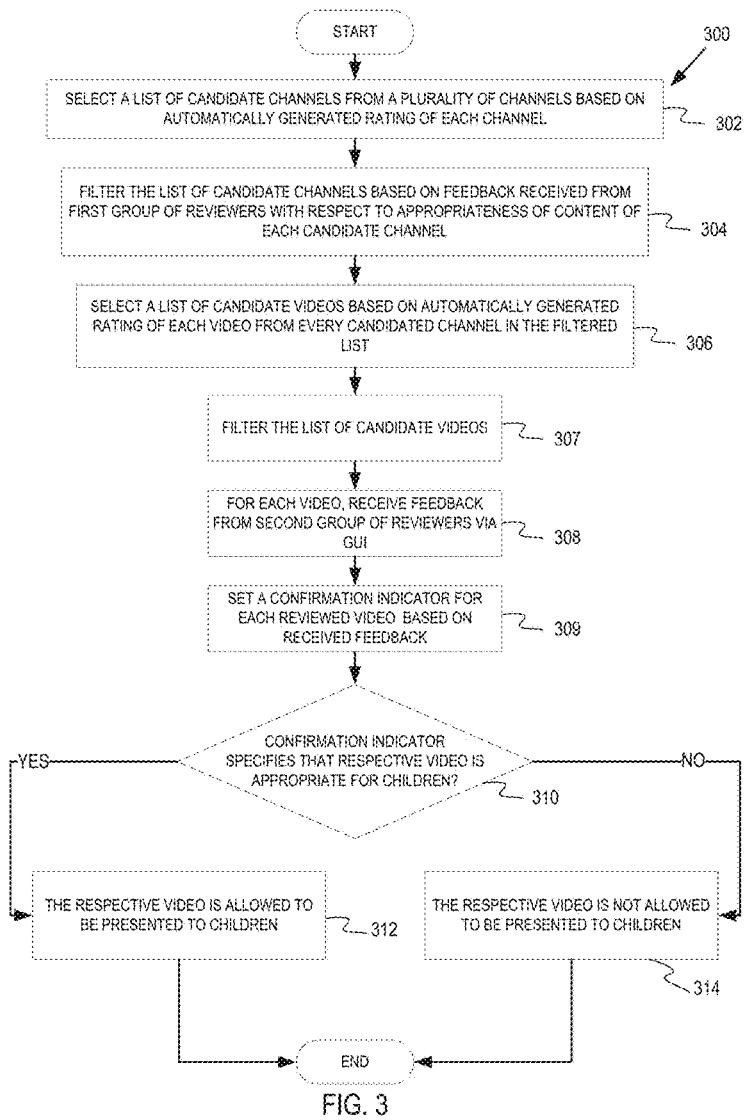
FIGS. 3 and 4 are flow diagrams illustrating methods for identifying appropriate content for children, according to some implementations.
Figure 4:
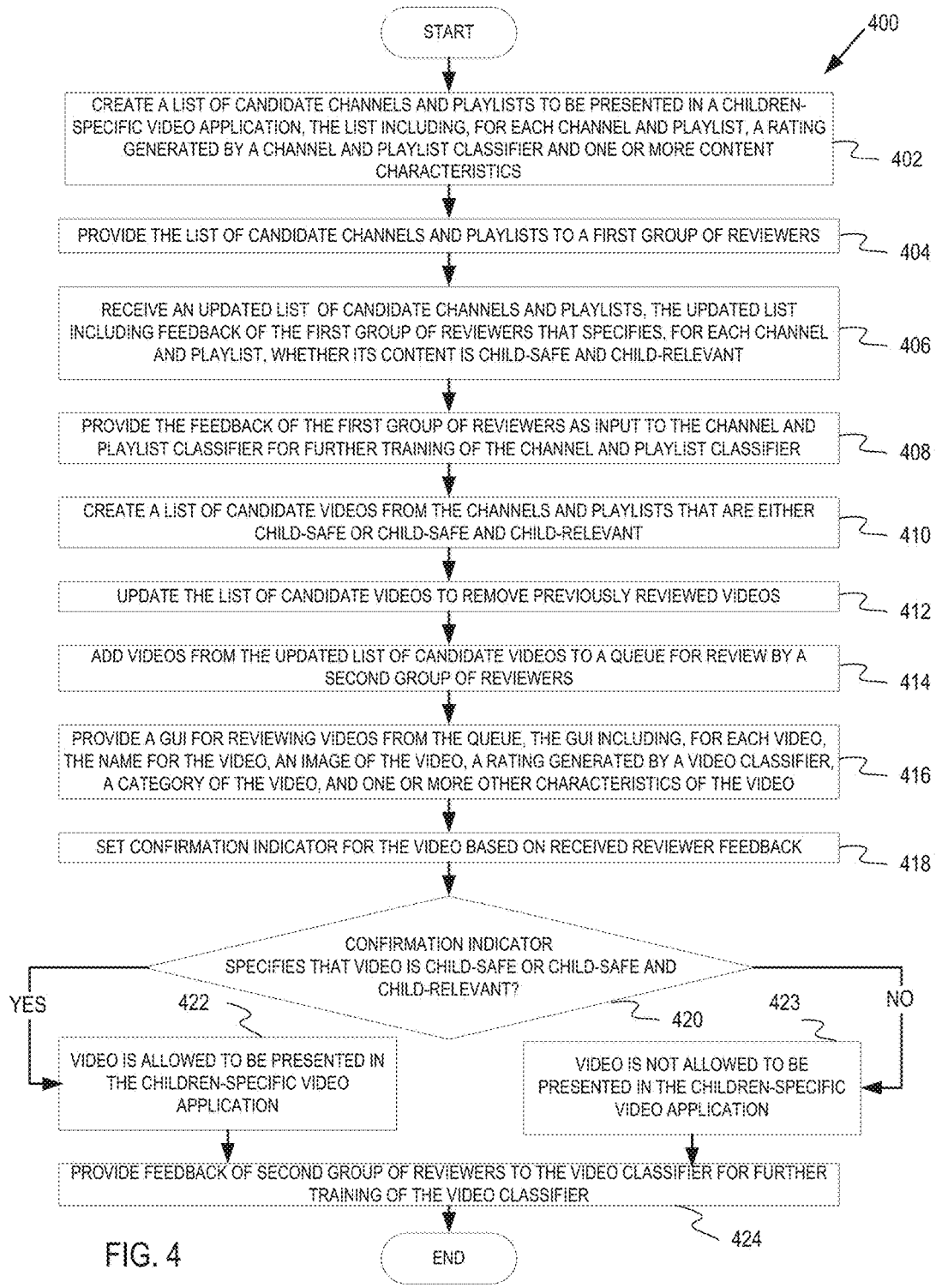

FIGS. 3 and 4 are flow diagrams illustrating methods for identifying appropriate content for children, according to some implementations. The methods 300, 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300, 400 may be performed by the children's content system 140 of FIG. 1.

Referring to FIG. 3, at block 302, the children's content system 140 selects a list of candidate channels from channels provided by the content sharing platform 120 based on an automatically generated rating of each of the provided channels. Each of the selected candidate channels in the list of candidate channels has an automatically generated rating that indicates appropriateness of content of a respective candidate channel for children. In some implementations, a rating of a candidate channel indicates appropriateness of its content for children if it is a G rating (content is child-safe) or a Y rating (content is both child-safe and child-relevant). In some implementations, the list of candidate channels can also include candidate playlists each having an automatically generated rating that indicates appropriateness of content of a respective candidate playlist for children.

At block 304, the children's content system 140 filters the list of candidate channels based on feedback received from a first group of reviewers with respect to appropriateness of content of each candidate channel for children. In some implementations, the feedback can include (a) an indication that content of the candidate channel is child-safe, or an indication that the content of the candidate channel is not child-safe and a reason for the indication that the content of the candidate channel is not child-safe, (b) an indication that the content of the candidate channel is child-relevant, or an indication that the content of the candidate channel is not child-relevant and a reason for the indication that the content of the candidate channel is not child-relevant, and (c) a confirmation indication that the candidate channel is to remain on the list, or a rejection indication that the candidate channel is to be removed from the list. If the list includes candidate playlists, similar feedback can be provided for each candidate playlist.

At block 306, the children's content system 140 selects a list of candidate videos based on an automatically generated rating of each video from every candidate channel in the filtered list of candidate channels. Each selected candidate video in the list of candidate videos has an automatically generated rating that indicates appropriateness of a respective candidate video for children.

At block 307, the children's content system 140 filters the list of candidate videos. For example, the children's content system 140 can filter the list of candidate videos by removing duplicate videos (e.g., if multiple channels include the same videos) and/or videos that already went through the human review phase.

At block 308, the children's content system 140 provides a GUI facilitating review of candidate videos from the filtered list of candidate videos by a second group of reviewers, and receives, via the GUI, feedback for each candidate video. At block 309, the children's content system 140 sets a confirmation indicator of each reviewed candidate video based on the received feedback. In some implementations, a confirmation indicator is part of metadata of each video, and the children's content system 140 updates the value of this confirmation indicator in response to the feedback received from a video reviewer. Alternatively, a candidate video may not initially have a confirmation indicator, and the children's content system 140 may add a confirmation indicator to the candidate video in response to the feedback received from the video reviewer (e.g., the children's content system 140 may add such an indicator to the candidate video if feedback received from the second group of reviewers via the GUI confirms that the candidate video is appropriate for children).

If the confirmation indicator specifies that the candidate video is appropriate for children (block 310), the candidate video is allowed to be presented to children (block 312). Otherwise, if the confirmation indicator specifies that the candidate video is not appropriate for children (block 310), the candidate video is not allowed to be presented to children.

FIG. 4 is a flow diagram illustrating another example method for identifying appropriate content for children, according to some implementations. Referring to FIG. 4, at block 402, the children's content system 140 creates a list of candidate channels and playlists to be presented in a children's specific video application. The list includes, for each candidate channel and playlist, a rating generated by a channel and playlist classifier and one or more content characteristics such as a location identifier of the candidate channel, a name of the candidate channel, etc. In some implementations, only channels and playlists that have a rating of G or Y are included in the list. Alternatively, only channels and playlists that have a rating of Y (child-safe and child-interesting) are included in the list.

At block 404, the children's content system 140 provides the list of candidate channels and playlists to a first group of reviewers. The list can be provided in a tabular form (e.g., as a spreadsheet).

At block 406, the children's content system 140 receives an updated list of candidate channels and playlists. The updated list can include feedback of the first group of reviewers that specifies, for each channel and playlist, whether its content is child-safe and whether its content is child-relevant. If the content is not child-safe, the feedback can include a reason why it is not child-safe. Similarly, if the content is not child-relevant, the feedback can include a reason why it is not child-relevant. At block 408, the children's content system 140 provides the feedback of the first group of reviewers as input to the channel and playlist classifier for further training of the channel and playlist classifier.

At block 410, the children's content system 140 creates a list of candidate videos from the updated list of candidate channels and playlists that are either child-safe or child-safe and child-relevant. In some implementations, only videos that have a rating of G or Y are included in the list. Alternatively, only videos that have a rating of Y (child-safe and child-interesting) are included in the list.

At block 412, the children's content system 140 updates the list of candidate videos to remove previously reviewed videos (as evidenced by the presence of a set confirmation indicator). At block 414, the children's content system 140 adds candidate videos from the updated list of candidate videos to a queue for review by a second group of reviewers.

At block 416, the children's content system 140 provides a GUI for reviewing candidate videos from the queue. The GUI can include, for each candidate video, the name for the candidate video, an image of the candidate video, a rating generated by a video classifier, a category of the candidate video, and one or more other characteristics of the candidate video. An example GUI is discussed in more detailed below in conjunction with FIG. 7.

At block 418, the children's content system 140 sets a confirmation indicator of the candidate video based on feedback received from a video reviewer for the candidate video via the GUI. For example, if the reviewer feedback confirms that the candidate video is child-safe or child-safe and child-relevant, the children's content system 140 updates the value of the confirmation indicator of the candidate video to "Y" or "G" rating. Alternatively, if the reviewer feedback does not confirm that the candidate video is child-safe or child-safe and child-relevant, the children's content system 140 updates the value of the confirmation indicator of the candidate video to a non-"Y" or non-"G" rating.

If the confirmation indicator specifies that the candidate video is child-safe or child-safe and child-relevant (block 420), the candidate video is allowed to be presented in the children-specific application (block 422). Otherwise, if the confirmation indicator specifies that the candidate video is not child-safe or not child-safe and not child-relevant (block 420), the candidate video is not allowed to be presented in the children-specific application (block 423).

At block 424, the children's content system 140 provides feedback of the second group of reviewers to the video classifier for further training of the video classifier.

Figure 5:
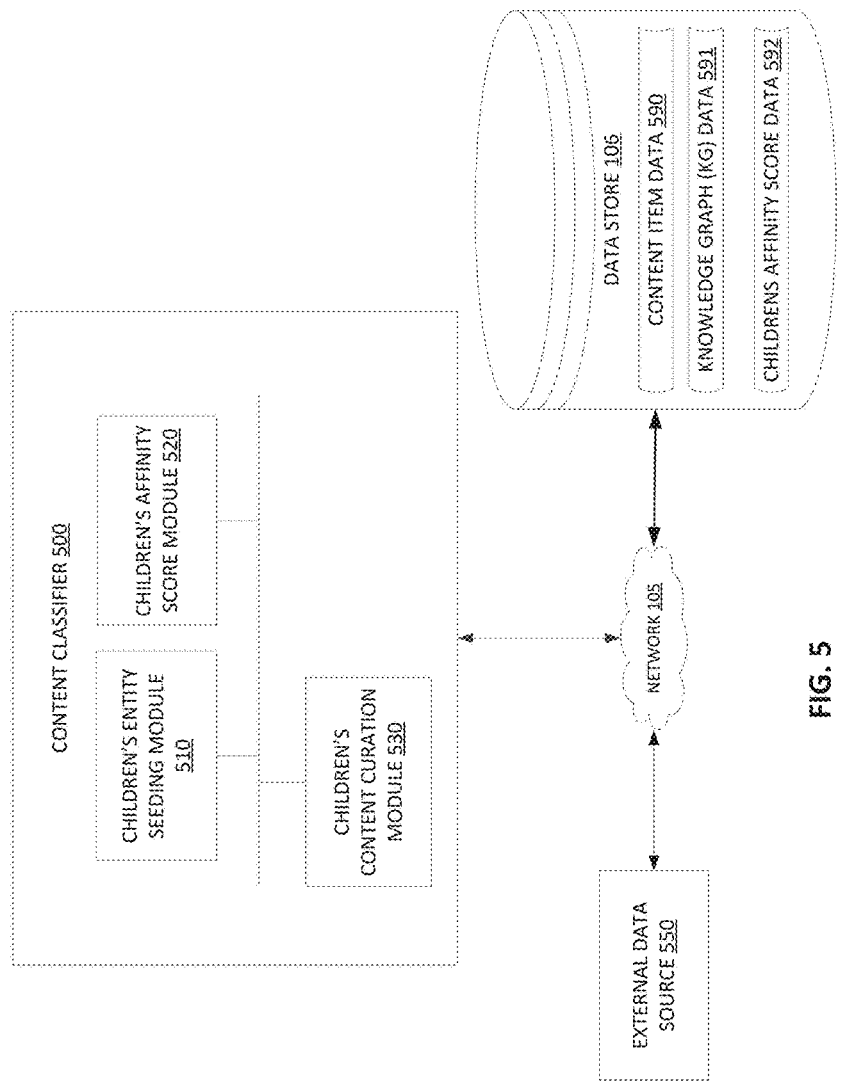
FIG. 5 is a block diagram illustrating a content classifier such as a channel classifier 160 or a video classifier 162, according to an implementation.

FIG. 5 is a block diagram illustrating one embodiment of a content classifier such as a channel classifier 160 or a video classifier 162. In some implementations, content classifier 500 can include a children's entity seeding module 510, a children's affinity score module 520, and a children's content curation module 530. The content classifier 500 can be coupled with data store 106 which can include content items (e.g., videos) data 590.

When assigning a rating to content, it is not only important to determine whether the content is safe for children (e.g., not mature, violent or explicit) but also whether the content is relevant (e.g., interesting or entertaining) for children. For example, a video covering a lecture on microeconomics may be safe for children but may be relevant at all for children. To address this, the children's entity seeding module 510 may identify entities that are potentially interesting or relevant to children. An entity may refer to a person, place, or thing (e.g., TV show, movie, song, book, article, animal, etc.). Data store 106 may maintain a knowledge graph (KG) 591 that is a knowledge base having structured information about a corpus of semantic entities and relational connections between the corpus of semantic entities. Each semantic entity (also referred to as "entity") has one or several types. Each content item (e.g., video) maintained in content item data 590 of data store 106 may be annotated with the entity or entities associated with the content item. For example, "Dora the Explorer" is a topic, TV program, film series, and award-winning work. If a content item of content item data 590 was a Dora the Explorer TV episode, this content item would be annotated with the Dora the Explorer entity that is stored in the KG data 591.

In addition, the KG data 591 may include a higher-level of abstraction of collections, and may group entities into collections, such as "children's TV programs" or "musicians." Refer to the previous example, the "Dora the Explorer entity may be grouped into the children's TV programs collection (as well as other different collections) in KG data 591.

The children's entity seeding module 510 may utilize the entities of the KG data 591 to identify entities (and collections) that are interesting for children, and thereby utilize these identified entities to locate content and content items that may be interesting for children as well (e.g., the content items annotated with the identified entities). For example, some entity types and collections in the KG data 591 are relevant for children, such as the children's TV program collection or the movies for ages 5 to 7 collection. These entity types and collections provide an already-generated and curated list (in certain cases, age-bucketed), but restricted to a limited set of domains. Aside from these direct sources, the children's entity seeding module may also run queries over the KG data 591 to infer interesting entities. The distribution of the subjects of the books in a children's literature literary genre collection is such an example (e.g., top subjects are "Animal", "Adventure", and "Family").

In other implementations, the children's entity seeding module 510 may use the KG data 591 as well as other external data sources 550 to identify entities that are interesting to children. The external data sources 550 may include, but are not limited to, websites and applications that publish ratings and reviews for content (e.g., TV shows, movies, games, applications, websites, books, music, etc.) that is safe and/or interesting for children. The children's entity seeding module 510 may access the external data source 550 (e.g., via network 105) and extract topics from the external data source 550.

In one implementation, topics are extracted from an external data source 550 based on a format that the data is stored, maintained, and/or presented at the external data source 550. For example, if the external data source 550 maintains data in a directory format, the children's entity seeding module 510 may download each root category from the external data source 550 and then extract the links that point to the sub-categories in each root category. Information such as a content label and age group associated with each link may also be extracted.

The extracted topics from external data sources 550 may then be reconciled with corresponding entities maintained in the KG data 591. As a result, an expanded set of entities from the KG data 591 may be identified as relevant and/or interesting to children.

In another implementation, the children's entity seeding module 510 may rely on the corpus of content (e.g., content item data 590) of the content sharing platform to identify entities interesting to children. The children's entity seeding module 510 may first identify the set of content items associated with a particular content label, such as a Y rating or TV-Y rating. Annotated entities are identified among the set of content items and used to populate a list of entities that are relevant and/or interesting to children. In some implementations, the quality (e.g., user rating) and popularity of the content items is used to select annotated entities.

In one implementation, the expanded set of entities identified as relevant and/or interesting to children is passed to children's affinity score module 520 to generate a children's affinity score for each identified entity. The children's affinity score module 520 may determine a children's affinity score for each entity in a variety of ways, depending on how the set of entities was generated.

When the set of entities is seeded from the KG data 591, with possible supplementation from external data sources 550, the children's affinity score module 520 may first identify all content items that have been annotated with these entities. Then, high-level filtering may be applied to remove, for example, certain language (e.g., non-English language content items) content items, content items with a mature or X rating, content items with a number of views below a threshold, and/or content items with a low quality (e.g., less than 3.0 out of 5).

The children's affinity score module 520 may then merge the resulting set of content items with any content items that are related to the set of content items. Content items may be considered related to one another based on signals including, but not limited to, number of co-watches by users and number of co-occurrences (e.g., in playlists). In some implementations, the related content items are also filtered on a high-level to remove certain language, mature content, low popularity, and low quality content.

The resulting single set of merged content items is then examined to identify entity annotations associated with the single set. The content items may then be grouped according the entity annotations. In some implementations, the content item may appear in multiple groups as a content item may have multiple different entity annotations corresponding to the content item. For each resulting entity, a children's affinity score for the entity may be calculated based on a function taking into account annotation scores for each content item in the group to the entity, an average quality of the content items in the group, average popularity of the content items in the group, and an average relatedness weight. In one implementation, the function aggregates these signals over the content items.

The annotation score may be a number from zero to one indicating how central/relevant an annotated entity is for the content item, where a higher value denotes that the entity is more central/relevant to the content item. The quality may be a score (e.g., on a scale of 1 to 5) that a user rates the content item. The popularity may indicate a number of views of the content item. The average relatedness weight may indicate how related content items are (e.g., in terms of co-watches and co-occurrences) to each other within the group. In some implementations, content items with an annotation score falling below a threshold value may be filtered out of the group. The result of the function as applied to the entity group is a children's affinity score for the particular entity.

In one implementation, when entities that are interesting and relevant to children are identified directly from the corpus of content of the content sharing platform, the entities may be identified from annotations of a set of content items (e.g., TV-Y rated content items, etc.) in the corpus. Each content item may have an annotation score for a particular entity. This annotation score may be a number from zero to one that indicates how central/relevant an annotated entity is for the content item, where a higher value denotes that the entity is more central/relevant to the content item.

For each identified entity, the children's entity seeding module 510 may aggregate the annotation scores associated with the entity over the set of content items, where each annotation score may be weighted by a view count for the content item associated with the particular annotation score (e.g., annotation scores for more popular content items are weighted more heavily in the aggregate of annotation scores for a particular entity). The result of the aggregation of weighted annotation scores for each entity is a global children's affinity score (also referred to as a global popularity score) of the entity in terms of the set of content items. This global children's affinity score may be stored as the children's affinity score for the entity, for example in children's affinity score data 592 of data store 106.

A children's affinity score for each entity may also be collection specific. If the children's affinity score is to be calculated for each entity in a collection, the children's entity seeding module 510 may first identify the collections in the KG data 591 that the identified entities are members. The global children's affinity score for the entity may be multiplied (or some other function performed) with a collection membership score associated with the entity/collection pair. The collection score may denote the strength of the entities membership in the collection, with a higher score indicating a more central/relevant relationship to the collection. The resulting number may be considered the collection-based children's affinity score of the entity.

In some implementations, the resulting entities identified as interesting to children are also used to assign a children's affinity score directly to content items (e.g., videos and other content sharing platform content) based on the annotations that the content items have for such entities.

The children's content curation module 530 may then utilize the calculated children's affinity score for entities in the KG data 591 to curate children's content for the content sharing platform. The following description discusses content curation in terms of identifying channels of the content sharing platform that are relevant for children. In other implementation, different types of content may also be identified including, but not limited to playlists and individual content items (e.g., videos). In one implementation, the children's content curation module 530 curates children's content for display on a home screen of a children-specific application or web page of the content sharing platform. In other implementations, children's content curation module 530 may curate children's content for other purposes, such as for search results, recommendations, watch next/related content, and so on.

When selecting channels that may be considered relevant to children, the children's content curation module 530 may first identify a set of candidate channels. The set of candidate channels may be selected based on satisfying one or more predetermined qualifications. The qualifications may include, but are not limited to, one or more of categories, upload state, number of content items in the channel, review status, and/or content label (e.g., Y or G) of the channel.

The category qualification may include the channel being classified in one or more categories. The categories may be pre-determined categories displayed on a home screen of a children's content interface and may include categories such as shows, music, learning, explore, do-it-yourself, hobbies, science, experiments, dinosaurs, etc. In some implementations, the categories may be personalized based on specific interest of users.

The upload state qualification may include selecting as candidates those channels that satisfy particular upload status constraints, such as the upload time of the most recent video being less than a predetermined threshold of time. For example, a channel may be selected as a candidate channel when it includes at least one content item that was uploaded to the channel less than one year ago. Similarly, the number of content items in the channel qualification may result in channels being selected as candidates when the channels include more than a predetermined threshold number of content items in the channel. This prevents channels that are not active or channels with a small number of content items from being selected as candidate channels.

Lastly, the review status qualification may include selecting those channels with a flag (or other marker) that is set to indicate a human or automated review of the channel has previously occurred to examine the content items in the channel. The examination of the content items in the channel may determine whether the material of the content item is appropriate for children and/or relevant to children. For example, content items related to taxes may be appropriate in terms of a content label for children, but may not be relevant to children.

Once a candidate set of channels is selected, the children's content curations module 530 may then identify the entities that are annotated for the content items in each candidate channel as well as the children's affinity score for each entity (calculated by children's affinity score module 520 as discussed above). For each content item in a candidate channel, an average children's affinity score for the content item and a view count for the content item is determined. In one implementation, the view count may be used as weighting factor for the children's affinity score, so that content items with a higher view count have the associated average children's affinity score weighted more than a content item with a lower view count. The resulting weighted children's affinity score is assigned to the content item.

For each candidate channel, the weighted children's affinity scores for the content items in a channel are aggregated to generate a children's affinity score for the candidate channel. In one implementation, the children's affinity scores for the candidate channels are then normalized. The candidate channels are then ranked based on the resulting children's affinity scores for the candidate channels, with a channel having the highest score ranked first, and so on. The top N channels from the ranking may then be selected as candidates for human review and, if confirmed during human review, for display on a children's content interface (e.g., home screen of a children's application of the content sharing platform).

As discussed above, feedback received from reviewers for candidate channels, playlists and videos can be provided as input to the content classifier 500 to adjust parameters used for classification and produce more accurate results.

Figure 6:
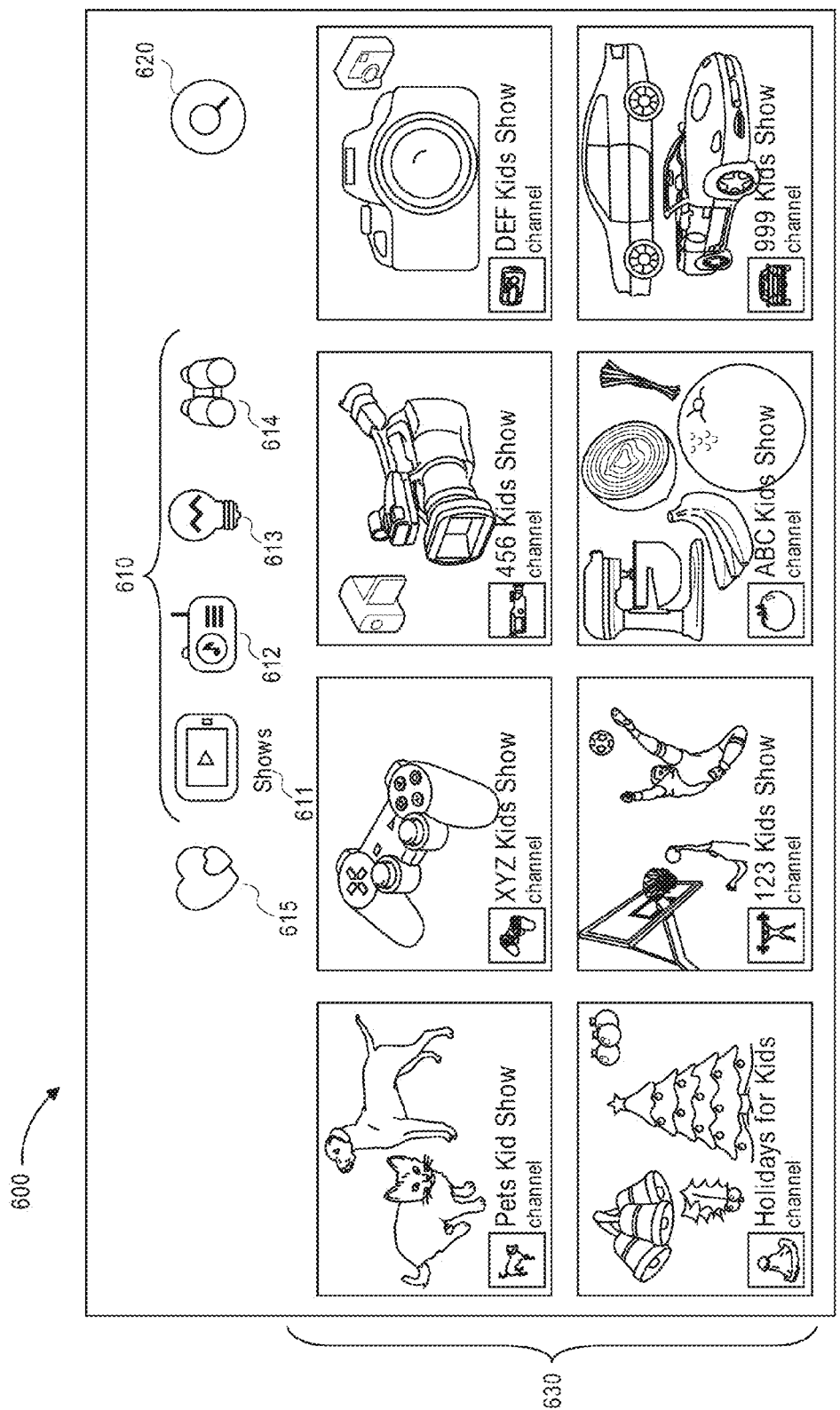
FIG. 6 illustrates an example children's home screen GUI providing content suggestions for children from a content sharing platform, according to implementations of the disclosure.

FIG. 6 illustrates an example screenshot of a children's home screen UI 600 providing content suggestions for children from a content sharing platform according to implementations of the disclosure. Children's home screen UI 600 may include a navigation bar running on the top of the UI 600 including category icons 610 and a recommendations icon 615. The category icons 610 may include a shows icon 611, a music icon 612, a learning icon 613, and an explore icon 614. As previously discussed, the categories provided in the UI 600 may vary in implementations of the disclosure and are not limited to those described herein. A search icon 620 is also displayed in UI 600.

When one of the category icons 610 or the recommendations icon 615 is selected, a one or more content icons 630 are rendered in the UI 600. The content icons 630 correspond to the category icon 610 or recommendations icon 615 selected via the UI 600 (e.g. by user). The content icons 630 may correspond to content such as channels or playlist, or content items such as videos. The content icons 630 displayed for a particular category icon 610 may be the content curated for children by the children's content system 140. For example, as illustrated in FIG. 6, content icons 630 correspond to channels of a content sharing platform selected as safe and relevant to children based on automatically generated scores and human review.

Figure 7:
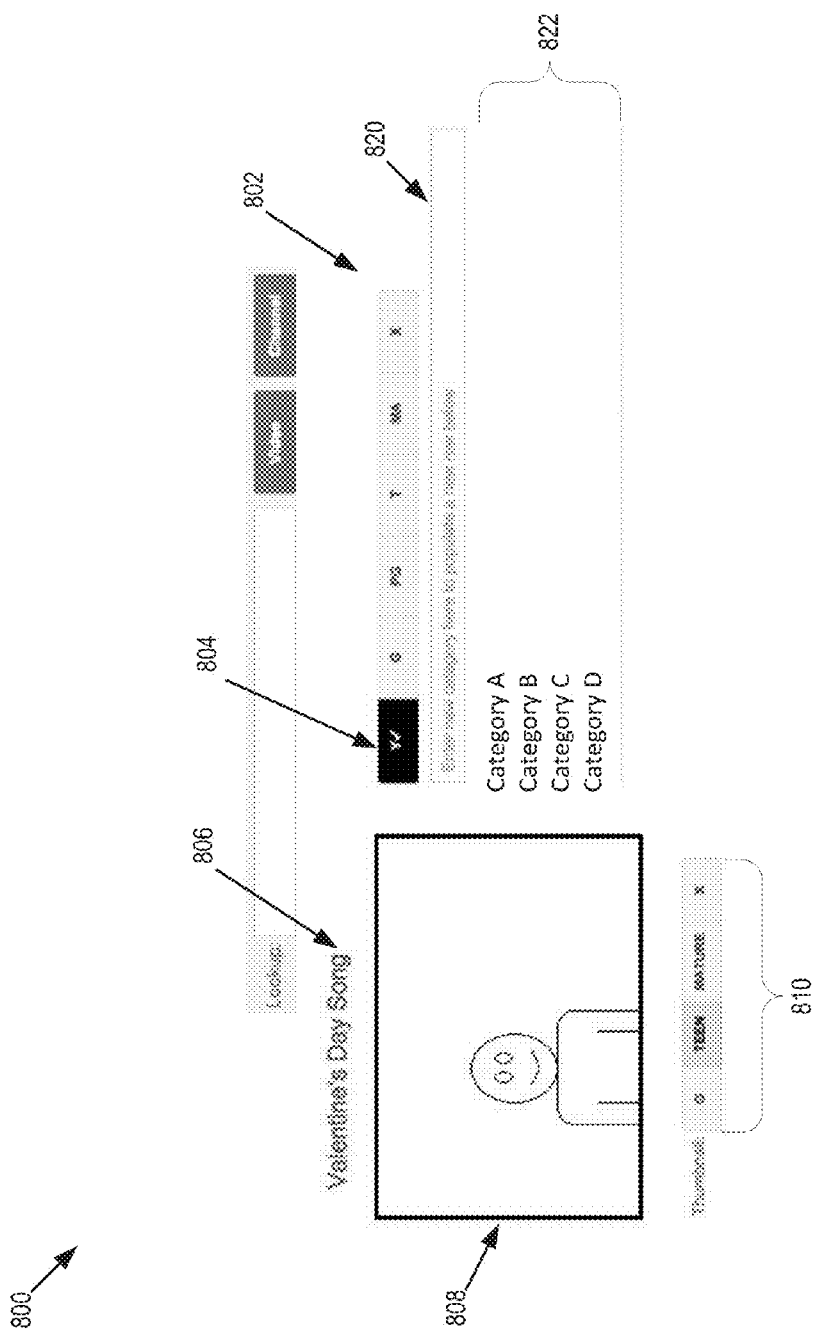
FIG. 7 is an example GUI facilitating review of a candidate video, according to an implementation.

FIG. 7 is an example graphical user interface (GUI) 800 facilitating review of a candidate video, according to an implementation. GUI 800 allows a reviewer to select a candidate video from the queue, and in response presents information about the candidate video including the name 806 of the candidate video, a thumbnail image 808 of the candidate video, and one or more categories 822 associated with the candidate video. GUI 800 also includes various rating options 802 for the candidate video, with its automatically generated rating highlighted or otherwise visually distinguished among the rating options 802. In some implementations, GUI 800 also includes rating options 810 for the video thumbnail, with its automatically generated rating highlighted or otherwise visually distinguished among the rating options 810.

The reviewer can view the presented information as well as the video itself, decide whether the automatically generated rating is accurate or not, and then either confirm the automatically generated rating (e.g., by selecting it) or select a different rating. GUI 804 visually illustrates the rating 804 selected by the reviewer (e.g., by highlighting it and adding a checkmark next to it).

Figure 8:
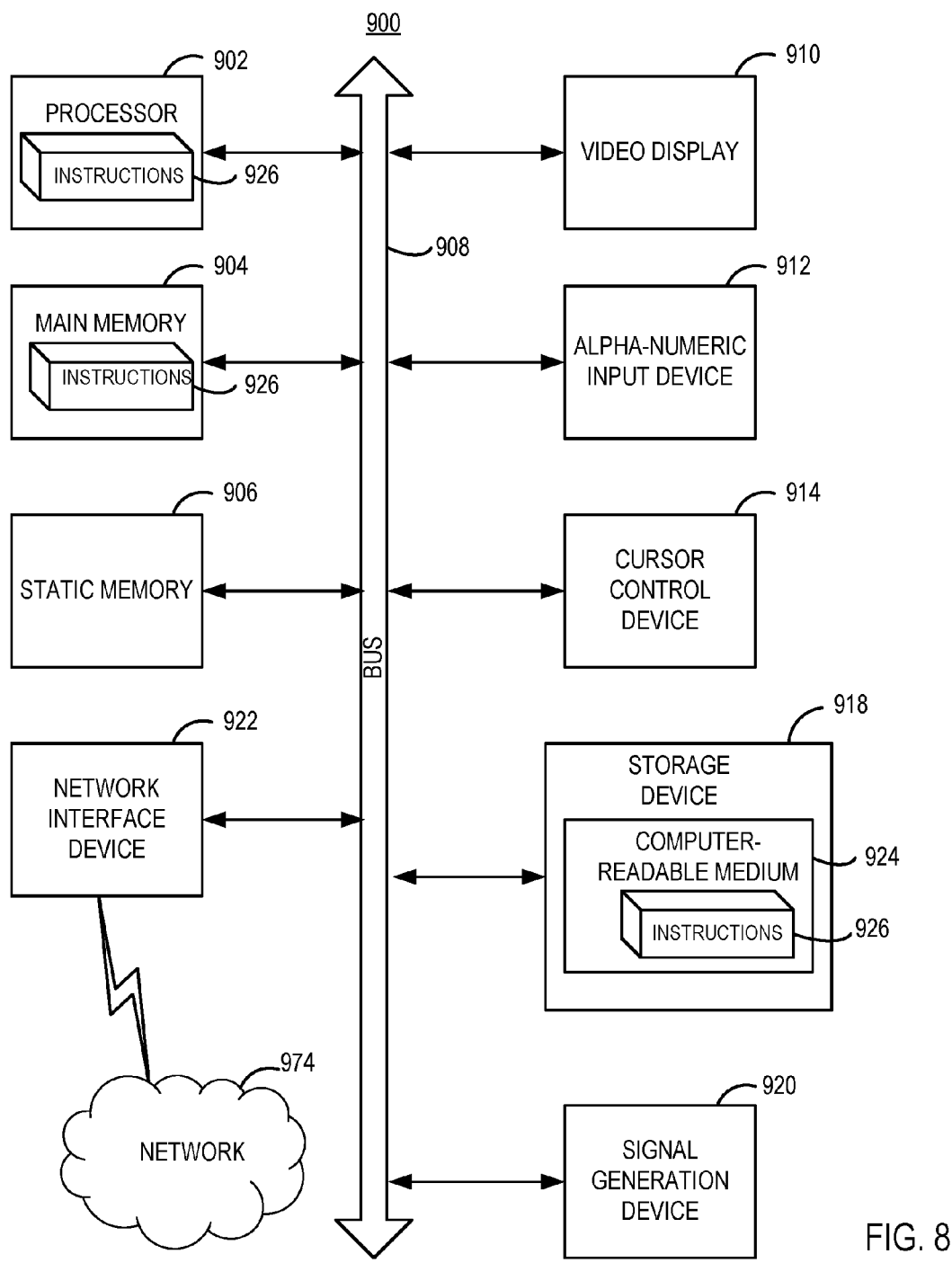
FIG. 8 is a block diagram illustrating one implementation of a computer system, according to an implementation.

FIG. 8 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a network connected television, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 900 may be representative of a server, such as server 102, executing a children's content system 140, as described with respect to FIGS. 1 and 2.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 916, which communicate with each other via a bus 908. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a computer-readable storage medium 924 (also referred to as a machine-readable storage medium), on which is stored one or more set of instructions 926 (e.g., software) embodying any one or more of the methodologies of functions described herein. The instructions 926 may also reside, completely or at least partially, within the main memory 904 and/or within the processing device 902 during execution thereof by the computer system 900; the main memory 904 and the processing device 902 also constituting machine-readable storage media. The instructions 926 may further be transmitted or received over a network 974 via the network interface device 922.

The computer-readable storage medium 924 may also be used to store instructions to perform a method for identifying content appropriate for children algorithmically without human interaction, as described herein. While the computer-readable storage medium 924 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   selecting a list of candidate channels from a plurality of channels of a content sharing platform based on automatically generated ratings of the plurality of channels, wherein a respective candidate channel in the list of candidate channels has a rating automatically generated without any user interaction to indicate appropriateness of content of the respective candidate channel for children;
   filtering, by a processing device, the list of candidate channels based on feedback received from a first group of reviewers with respect to appropriateness of content of the respective candidate channel for children;
   selecting a list of candidate videos based on automatically generated ratings of videos from every channel in the filtered list of candidate channels, wherein a respective candidate video in the list of candidate videos has an automatically generated rating that indicates appropriateness of the respective candidate video for children;
   providing a graphical user interface facilitating review of candidate videos from the list of candidate videos by a second group of reviewers; and
   upon receiving, via the graphical user interface, a confirmation that the automatically generated rating for the respective candidate video from the list of candidate videos accurately indicates that the respective candidate video is appropriate for children, setting a confirmation indicator for the respective candidate video to enable presentation of the respective candidate video to children on a plurality of user devices that each include an application associated with the content sharing platform for presenting videos with a set confirmation indicator.

2. The method of claim 1 wherein the list of candidate channels further comprises candidate playlists.

3. The method of claim 1 wherein the automatically generated rating of the respective candidate channel is generated by a first classifier.

4. The method of claim 3 wherein the method further comprises:
   providing the feedback received from the first group of reviewers to the first classifier for further training of the first classifier.

5. The method of claim 1 wherein the automatically generated rating is an indicator of child-safe content or an indicator of child-safe and child-relevant content.

6. The method of claim 1 wherein the respective candidate channel of the list of candidate channels comprises a location identifier of the respective candidate channel, and a name of the respective candidate channel.

7. The method of claim 1 wherein the feedback generated from the first group of reviewers comprises, for the respective candidate channel:
   an indication that content of the respective candidate channel is child-safe, or an indication that the content of the respective candidate channel is not child-safe and a reason for the indication that the content of the respective candidate channel is not child-safe,
   an indication that the content of the respective candidate channel is child-relevant, or an indication that the content of the respective candidate channel is not child-relevant and a reason for the indication that the content of the respective candidate channel is not child-relevant; and
   a confirmation indication that the respective candidate channel is to remain on the list, or a rejection indication that the respective candidate channel is to be removed from the list.

8. The method of 1 wherein filtering the list of candidate channels comprises removing, from the list of candidate channels, any candidate channel associated with a rejection indication.

9. The method of claim 1 wherein selecting the list of candidate videos comprises:
   identifying candidate videos from the filtered list of candidate channels; and
   removing duplicate videos and previously reviewed videos from the identified candidate videos.

10. The method of claim 1 wherein the graphical user interface includes a name of the respective candidate video, an image of the respective candidate video, a rating generated by a second classifier, one or more categories associated with the respective candidate video, an identifier of the respective candidate video, and a channel associated with the respective candidate video.

11. The method of claim 1 wherein the graphical user interface facilitates user input confirming that the respective candidate video is appropriate for children or user input indicating that the respective candidate video is not appropriate for children.

12. The method of claim 10 further comprising
   providing the user input regarding appropriateness of the respective candidate video for children to the second classifier for further training of the second classifier.

13. The method of claim 1 wherein the videos with the set confirmation indicator are selectable for display on a home screen user interface of the application that is a children-specific content application.

14. The method of claim 1 further comprising blacklisting or whitelisting a channel from the list of candidate channels based on the feedback received from the first group of reviewers.

15. A system comprising:
   a memory; and
   a processing device coupled to the memory, wherein the processing device is to:
   select a list of candidate channels from a plurality of channels of a content sharing platform based on automatically generated ratings of the plurality of channels, wherein a respective candidate channel in the list of candidate channels has a rating automatically generated without any user interaction to indicate appropriateness of content of the respective candidate channel for children;
   filter the list of candidate channels based on feedback received from a first group of reviewers with respect to appropriateness of content of the respective candidate channel for children;
   select a list of candidate videos based on automatically generated ratings of videos from every channel in the filtered list of candidate channels, wherein a respective candidate video in the list of candidate videos has an automatically generated rating that indicates appropriateness of the respective candidate video for children; and upon receiving, via a graphical user interface, a confirmation that the automatically generated rating for the respective candidate video from the list of candidate videos accurately indicates that the respective candidate video is appropriate for children, set a confirmation indicator for the respective candidate video to enable presentation of the respective candidate video to children on a plurality of user devices that each include an application associated with the content sharing platform for presenting videos with a set confirmation indicator.

16. The system of claim 10 wherein the list of candidate channels further comprises candidate playlists.

17. The system of claim 10 wherein:
the automatically generated rating of the respective candidate channel is generated by a first classifier; and
the processing device is further to provide the feedback received from the first group of reviewers to the first classifier for further training of the first classifier.

18. The system of claim 10 wherein the automatically generated rating is an indicator of child-safe content or an indicator of child-safe and child-relevant content.

19. The system of claim 10 wherein the feedback generated from the first group of reviewers comprises, for a respective candidate channel:
an indication that content of the respective candidate channel is child-safe, or an indication that the content of the respective candidate channel is not child-safe and a reason for the indication that the content of the respective candidate channel is not child-safe,
an indication that the content of the respective candidate channel is child-relevant, or an indication that the content of the respective candidate channel is not child-relevant and a reason for the indication that the content of the respective candidate channel is not child-relevant; and
a confirmation indication that the respective candidate channel is to remain on the list, or a rejection indication that the respective candidate channel is to be removed from the list.

20. A non-transitory machine-readable storage medium storing instructions which, when executed, cause a processing device to perform operations comprising:
selecting a list of candidate channels from a plurality of channels of a content sharing platform based on automatically generated ratings of the plurality of channels, wherein a respective candidate channel in the list of candidate channels has a rating automatically generated without any user interaction to indicate appropriateness of content of the respective candidate channel for children;

filtering, by the processing device, the list of candidate channels based on feedback received from a first group of reviewers with respect to appropriateness of content of the respective candidate channel for children;

selecting a list of candidate videos based on automatically generated ratings of videos from every channel in the filtered list of candidate channels, wherein a respective candidate video in the list of candidate videos has an automatically generated rating that indicates appropriateness of the respective candidate video for children; and upon receiving, via a graphical user interface, a confirmation that the automatically generated rating for the respective candidate video from the list of candidate videos accurately indicates that the respective candidate video is appropriate for children, setting a confirmation indicator for the respective candidate video to enable presentation of the respective candidate video to children on a plurality of user devices that each include an application associated with the content sharing platform for presenting candidate videos with a set confirmation indicator.

* * * * *